(12) United States Patent
Hayball et al.

(10) Patent No.: US 7,343,399 B2
(45) Date of Patent: Mar. 11, 2008

(54) APPARATUS AND METHOD FOR MANAGING INTERNET RESOURCE REQUESTS

(75) Inventors: Clive Hayball, Herts (GB); Nigel Bragg, Weston Colville (GB); Gordon Bradley, Brampton (CA); Martin Biddiscombe, Harl w (GB); Julian Cable, Herts (GB); Philip Davies, Chelmsford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 616 days.

(21) Appl. No.: 09/888,730

(22) Filed: Jun. 25, 2001

(65) Prior Publication Data

US 2003/0009591 A1    Jan. 9, 2003

(51) Int. Cl.
*G06F 15/16* (2006.01)
(52) U.S. Cl. ...................................... 709/219; 709/228
(58) Field of Classification Search ................ 709/245, 709/238, 239, 104, 105, 203, 223, 228, 219; 712/27; 718/105
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 6,092,178 | A * | 7/2000 | Jindal et al. | 712/27 |
| 6,233,618 | B1 * | 5/2001 | Shannon | 709/229 |
| 6,381,651 | B1 * | 4/2002 | Nishio et al. | 709/245 |
| 6,446,048 | B1 * | 9/2002 | Wells et al. | 705/35 |
| 6,449,657 | B2 * | 9/2002 | Stanbach et al. | 709/245 |
| 6,480,508 | B1 * | 11/2002 | Mwikalo et al. | 370/475 |
| 6,484,143 | B1 * | 11/2002 | Swildens et al. | 705/1 |
| 6,493,765 | B1 * | 12/2002 | Cunningham et al. | 709/245 |
| 6,578,066 | B1 * | 6/2003 | Logan et al. | 718/105 |
| 7,032,031 | B2 * | 4/2006 | Jungck et al. | 709/246 |

\* cited by examiner

*Primary Examiner*—Larry D. Donaghue
*Assistant Examiner*—Asghar Bilgrami
(74) *Attorney, Agent, or Firm*—Barnes & Thornburg LLP; William M. Lee, Jr.

(57) ABSTRACT

DNS in its native form cannot identify a good or best server. Traditional Service Providers deploy a centralised approach to global traffic management based on enhancements to DNS, but do have the capability to augment this with edge-based server selection because they do not own/operate an edge network. Their resolution of DNS requests is typically restricted to identifying candidate servers within an edge domain rather than selecting the "best" server. The invention proposes a method of handling Internet resource requests whereby a local lookup server receiving a request searches for a best server able to satisfy the resource request. The local lookup server finds the best server by searching a database for a resource record associated with the best server, and then uses the resource record to retrieve an identifier of a series of executable instructions that are executed to locate the best server. The resource requests and responses may hold additional information relating to operational characteristics which may used to determine the best server. The invention proposes a DNS record type comprising a user-defined field for conveying this additional information in the resource request and in the response. The invention also proposes architecture for handling the resource request comprising a network server that provides the requested resource using the best server, as well as a communications network comprising this architecture.

17 Claims, 1 Drawing Sheet

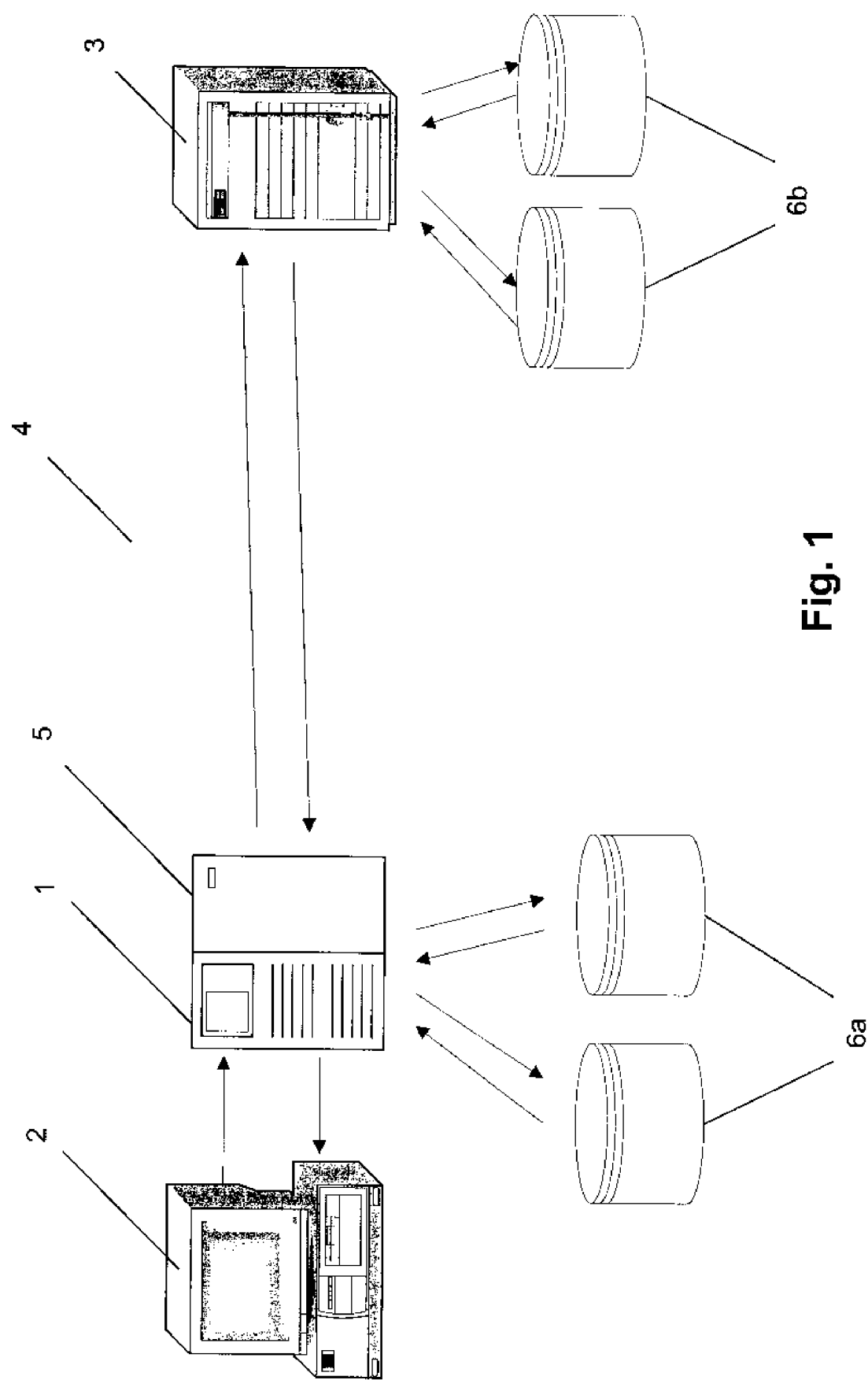

APPARATUS AND METHOD FOR
MANAGING INTERNET RESOURCE
REQUESTS

FIELD OF THE INVENTION

The present invention relates to an apparatus and method for managing internet resource requests, and more particularly, for determining a compatible Internet entity to satisfy a client's request.

BACKGROUND OF THE INVENTION

Domain Name Service (DNS) is the internet's current mechanism to map a service request (specified as a fully qualified domain name) onto a server that can provide the requested service. However, DNS in its native form cannot identify a "good" or "best" server. Another limitation of DNS is that security is limited to server authentication; client authorisation is not supported.

A commercial problem faced by Internet Service Providers (ISP's) is how to offer differentiated service offerings whilst competing with specialized Content Delivery Service Providers (CDSP's).

Traditional Content Delivery Service Providers (CDSP's) deploy a centralised approach to global traffic management, based on enhancements to DNS. In this approach DNS requests are handled by a central server that uses the IP address within each request to deduce the geographical/topological location of the client/proxy. However, CDSP's do not have the capability to augment this with edge-based server selection as they do not own/operate an edge network. Consequently, their resolution of DNS requests is typically restricted to identifying candidate servers within an edge domain—rather than selecting the "best" server within that domain.

Other DNS based application independent approaches to traffic management such as "Ping" race and DNS response race also suffer from the same shortcomings. The "ping" race approach is where a DNS request triggers synchronized "pings" from a set of candidate servers to a point close to the client, and whereby the server that responds fastest back to the DNS server is preferred. The DNS response race is where a DNS request is passed to each site with candidate servers whereby each site responds to the DNS query with a server IP address such that the fastest response to be received by the client wins. A further shortcoming associated with existing DNS based approaches is that knowledge of client location is often insufficient, especially if the client uses a proxy DNS server that is not very close to the data path. In addition, "ping" based approaches are inadequate as they do not take the server or application load into consideration.

Another application independent approach that can be used to manage internet traffic is Dynamic Routing which is router based. Here, a set of application servers is given a single IP address, and a router performs health checks and advertises a host route for each healthy cluster, whereby the least cost route wins. However, this router approach is not scalable as it fragments forwarding entries in multiple routers because "virtual" IP addresses cannot be equated to specific subnets.

A third type of approach is application dependent and is the HTTP race approach. Here, the HTTP request is communicated by the origin server to a set of candidate servers. Each server then responds simultaneously back to the client, whereby the first response is accepted and that server is chosen. Subsequent responses are rejected as TCP-layer duplicates. As well as having many of the above-mentioned shortcomings, application dependent approaches must be implemented separately for each application of interest.

Furthermore, none of the existing approaches can support session-based Quality of Service (QoS) end-to-end. Using "snapshot" and or averaged network delay statistics does not guarantee that adequate network resources will be available for the duration of the transaction of interest.

There is therefore a need for a network traffic management system that enables an ISP to offer an edge-based server selection capability directly to Content Providers.

There is also a need for a network traffic management system that enables an ISP to find the best server from which to deliver a piece of content under given conditions involving network, server and/or application load, and optionally ensuring that the path from client to server is guaranteed a required level of QoS.

It is a general objective of the present invention to overcome or significantly mitigate one or more of the aforementioned problems.

SUMMARY OF THE INVENTION

The present invention addresses some of the problems by providing a system that allows an ISP to offer an edge-based server selection capability directly to Content Providers. Additional information may be utilised to find the best server to satisfy a request, and a variety of look up mechanisms and functions is supported.

According to a first aspect of the invention there is provided a method of handling a resource request, comprising: receiving a resource request at a network server from a client, the resource request comprising a first identity of a network entity; searching a database for a resource record associated with a best instance of the network entity; the best instance of the network entity being defined by the instance of the network entity that is most compatible with the resource request; retrieving an identifier of a series of executable instructions from the resource record; and executing the series of instructions to facilitate providing the requested resource to the client by the best instance of the network entity.

According to a second aspect of the invention there is provided a method of handling a resource request, comprising: receiving a resource request concerning access to a network entity from a client, said resource request comprising a first identity of the network entity and information relating to an operational characteristic; searching a database for a resource record associated with a best instance of the network entity, the best instance of the network entity being defined by the instance of the network entity that is most compatible with the operational characteristic; retrieving an identifier of a series of executable instructions from the resource record; and executing the series of instructions to facilitate providing the requested resource to the client by the best instance of the network entity.

According to a third aspect of the invention there is provided a DNS record for conveying a response, comprising a user-defined text-field for specifying Content Selection Criteria for finding a best instance of a network entity for providing a requested resource; the best instance of the network entity being defined by the instance of the network entity that is most compatible with the requested resource.

According to a fourth aspect there is provided a DNS record for conveying a resource request, comprising an user-defined text-field for specifying at least one operational characteristic of a client network entities compatible with the requested resource on the basis of operational characteristic.

According to a fifth aspect there is provided a scaleable architecture for handling a resource request from a client, the resource request comprising a first identity of a network entity, the architecture comprising: a network server for providing the requested resource to the client by a best instance of the network entity in response to receiving the resource request from the client, said best instance of the network entity being defined by the instance of the network entity that is most compatible with the resource request with respect to Content Selection Criteria.

According to a sixth aspect there is provided a scaleable architecture for handling a resource request from a client, the resource request comprising a first identity of a network entity, the architecture comprising: a network server for providing the requested resource to the client by a best instance of the network entity in response to receiving the resource request from the client, said best instance of the network entity being defined by the instance of the network entity that is most compatible with the resource request with respect to Content Selection Criteria.

According to a seventh aspect there is provided a computer readable storage medium storing instructions that, when executed by a computer, cause the computer to perform a method for handling a resource request, the method comprising; receiving a resource request at a network server from a client, said resource request comprising a first identity of a network entity; searching a database for a resource record associated with a best instance of said network entity; said best instance of the network entity being defined by the instance of the network entity that is most compatible with the resource request; retrieving an identifier of a series of executable instructions from said resource record; and executing said series of instructions to facilitate providing the requested resource to said client by said best instance of the network entity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described by way of example only, with reference to the drawing in which- FIG. 1 is a schematic diagram depicting an illustrative environment in which an embodiment of the present invention; may be implemented to handle client requests for resources.

DETAILED DESCRIPTION OF THE PREFERRED EMBODIMENTS

With reference to FIG. 1, a distributed Internet management system comprises a Generic Local Lookup Service (GLLS) in communication with a set of clients 2 and a set of Generic Domain Lookup Services (GDLS's) 3 across the internet or a WAN 4. Conversely, each GDLS may be in communication with a set of GLLS's.

The preferred embodiment involves two principle entities: the Generic Local Lookup Service (GLLS) 1 and the Generic Domain Lookup System (GDLS) 3. Typically, a GLLS would be owned by a Network Service Provider and reside at the network edge A a GDLS would be owned by a Content Service Provider and reside at a centralised location, such as an Internet Data Center. A commercial relationship between these two owners is envisaged, but is not essential to operation.

A Client request reaches the GLLS 1 by way of an agreed protocol. This could be DNS, CORBA, LDAP, etc. The request is adapted in to a generic form by the GLLS 1. Additional information such as speed or client location can be inserted at this stage. The request is then passed to an appropriate GDLS 3, using its preferred protocol, according to the service domain. GDLS 3 requests may be supported via DNS, SQL, LDAP, etc. if the protocol used to support GDLS 3 requests is other than DNS, then a translation interface is provided between the GLLS 1 and GDLS 3, preferably forming part of the GLLS 1. DNS is currently the best way to find an authoritative address for a GDLS 3. If the GDLS 3 protocol provides security support e.g. secure SQL, this can be used; otherwise certificates in request/response messages as part of the data may be used. A key security feature is that both GLLS 1 and GDLS 3 are authenticated in a single transaction. The GDLS 3 provides a service look-up according to pre-defined mappings. It returns a list of entries which can be IP addresses or names of other services. The GLLS can chose to re-order the entries returned to it. It can perform further look-ups on the entries if they are service names using recursion. Finally, it returns an ordered list of entries to the original client.

By disabling incoming network requests from Content Delivery Service Providers (CDSP's), the ISP can also hide details of its own network from outsiders wishing to provide an equivalent service. This allows the ISP to increase the value of its offerings.

At the stage where the client request is being adapted in to generic form by the GLLS 1, optional information may be added to the request. Although DNS provides an application independent means to identify physical servers associated with a given host name, the host name does not in general provide sufficient information to enable server choices based on additional information such as client location, access speed, terminal type etc. Nevertheless, client location can sometimes be deduced from the location of a proxy DNS that forwards the requests to the authoritative DNS server. However, this provides only very approximate information and can be misleading if the proxy is distant from the client. Core DNS protocol standards (RFC 1034/5) allow requests and responses to be posted that contain an additional information field. However, no use for this field is specified and most existing implementations of DNS produce unexpected and/or incorrect results when presented with additional information in a request. An experimental DNS standard (RFC 1464) defines a proposed format for text in additional information records.

Because additional information records can be properly inserted into DNS responses, this enables a mechanism whereby client or proxy DNS servers can identify authorative DNS servers that know how to process additional information in requests. Specific servers may then be enhanced to select IP addresses based on the additional information thus received. For example, it is possible to use the additional information record in a response for the GDLS to inform a GLLS of its capability to handle this additional information. The additional information tells the GLLS whether the GDLS (remote server) is capable of receiving the information that the GLLS would like to send in the request.

By adding optional additional information such as client location and access speed to the request it is possible for the GDLS, which receives the request from the GLLS, to use this information to refine the set of candidate servers it finds that would be acceptable to deliver the required content to the client.

Once the GDLS has found a set of servers that are able to provide the requested content or resource, it returns a response to the GLLS identifying those servers. The response also includes an additional information record for containing server selection criteria, such as dial location or access speed, which the GLLS may use to select a "best" server.

In order for the GLLS 1 and GDLS 3 to gather information about candidate servers each of the GLLS 1 and GDLS 3 have a Content Distribution Point Manager (CDPM) interface function. The CDPM 6a, 6b is an agent for a server or server cluster, and provides information about services characteristics for a given server. The CDPM's 6a associated with the GLLS's 1 provide information about local servers within the ISP domain, and as these CDPM's 6a would normally be under the control of the ISP, network statistics for local servers can be accurately obtained.

A "best" server is found in the following way:

When a client 2 makes a service request, typically via DNS, the GLLS 1 intercepts the requests, augments it with optional additional information and forwards it to the GDLS 3. Using its server and network knowledge base gained from information provided by its associated CDPM's 6b, the GDLS 3 returns a small set of candidate servers plus, optionally, server selection criteria. The GLLS 1 intercepts the response and chooses the best server based on the criteria, such as speed or client location, returned from the GDLS 3 or from a pre-configured algorithm, or from a set of local servers. The GLLS 1 returns a DNS response to the client 2 of an ordered list of best servers based on the whole set of servers, both local and remote.

Thus the GLLS 1 performs a selection of local servers and of other remote GLLS's in ISP's network, and the GDLS 3 performs the selection of remote servers.

An example of how a best server may be found in response to a DNS query by using the method of adding optional information to the request handled by the GLLS will now be described.

The most prevalent DNS is Bind. In Bind, the entries defining a master server for a zone are given in files. The file below shows the format usually used for an un-enhanced server:

```
$TTL    3
$ORIGIN gchire.com.
@       IN   SOA   6a.switchlets.nortel.com. biddis.nortelnetworks.com.
                   2001012401
                   3600
                   360
                   10800
                   10 )
        IN   NS    6a.switchlets.nortel.com
www     IN   A     10.11.3.61
www     IN   A     10.11.1.141
media   IN   A     10.11.3.61
media   IN   A     10.11.1.141
media   IN   A     10.11.3.65
```

This file defines the IP addresses of two servers: www.gchire.com and media.gchire.com. In this example www.gchire.com is served from two addresses (10.11.3.61 and 10.11.1.141) and media.gchire.com is server from three (10.11.3.61, 10.11.1.141 and 10.11.3.65). An un-enhanced DNS server, in response to a query, returns all the addresses that match the queried server name, but in no particular order. A DNS server will usually change the order in which the list is presented each time a request is received. Correctly configured clients select the first entry from the list of servers returned in response to a DNS query.

By contrast, the file below shows how additional fields may be used to enable the operation of the 'Find Best' function at the GLLS.

```
$TTL    3
$ORIGIN gchire.com.
@       IN   SOA   6a.switchlets.nortel.com. biddis.nortelnetworks.com.
                   2001012401
                   3600
                   360
                   10800
                   10 )
        IN   NS    6a.switchlets.nortel.com.
        IN   TXT   "Global Car Hire"
www     IN   A     10.11.3.61
www     IN   A     10.11.1.141
www     IN   TXT   [CDCpingms < 10 250 1]
media   IN   A     10.11.3.61
media   IN   A     10.11.1.141
media   IN   A     10.11.3.65
media   IN   TXT   [Cdpingms < 10 250 0.8] [CDCload < 0.5 0.8 1.3]
```

Two lines have been added, namely:

```
www    IN   TXT   [CDCpingms < 10 250 1]
and
media  IN   TXT   [CDCpingms < 10 250 0.8] [CDCload < 0.5 0.8 1.3]
```

These define the Content Selection Criteria to be used for www.gchire.com and media.gchire.com respectively, and may be retrieved from the DNS server by any resolver that sends a correctly formatted request. The DNS specification (RFC 1033, RFC 1034, RFC 1035) provides for the inclusion of text fields, placing no restriction on the format or use of those fields.

The preferred format of these fields for interoperability with the GLLS is:

Zero or more Content Selection Criteria may be specified for a server.

Individual Content Selection Criteria are delimited by square brackets.

If two or more Content Selection Criteria are specified for a server, they are either separated by white-space from other criteria on the same line, or they are specified on a new line.

The preferred format of individual Content Selection Criteria is five white-space separated field containing, in order:

The variable name to be queried (for example 'load') which should begin with the string literal 'CDC' (in order to assist the L-TLS in recognising valid Content Selection Criteria), and which should, for human readability be named in an intuitive manner.

The type of comparison (for example '<' or '>=').

The target value for the variable against which the selection result should be normalised.

The threshold value for the variable (below or above which a server is deemed to have failed the selection test altogether).

The weighting to be applied to the result of testing this criterion.

The format may be more readily understood by considering an example.

CDCpingms<10 250 0.8

In this example, the variable to be monitored is 'pingms' which means the round trip time in milliseconds between the CDPM and the GLLS as reported by the ping function. The type of comparison is '<', in other words, a given server is considered 'better' if its value of 'pingms' is lower than the target, and its value must be lower that the threshold for the server to be acceptable. The target value is 10 milliseconds, the threshold value is 250 milliseconds, and the weighting to be applied to the test result is 0.8. For example, if three servers' CDPMs A, B and C had 'ping' round trip times to the GLLS of 6 ms, 34 ms and 573 ms respectively, the GLLS would evaluate their scores against the 'pingms' variable as:

A: 6<250, therefore score=(6/10)*0.8=0.48

B: 34<250, therefore score=(34/10)*0.8=2.72

C: 573>250, therefore score=+infinity

The CDPM with the lowest score is deemed to be the best performer. If two or more Contact Selection Criteria are specified, the results from each test should be added together to determine the outcome of the 'Find Best' function. For example, if the second criterion is:

CDCload<0.5 0.8 1.3 and the values for each CDPM A, B and C are 0.5 m 0.2 and 0.7 respectively, then the GLLS would evaluate their scores against the 'load' variable as:

A: 0.5<0.8, therefore score=(0.5/0.5)*1.3=1.3

B: 0.2<0.8, therefore score=(0.2/0.5)*1.3=0.52

C: 0.7<0.8, therefore score=(0.7/0.5)*1.3=1.82 and the combined score ('pingms' and 'load' combined) for each CDPM would be:

A: 0.48+1.3=1.78

B: 2.72+0.52=3.24

C: +infinity+1.82=+infinity

So, in this example, server A would be returned as the current best available server.

If more than one server passes the selection thresholds, the Find Best function may return an ordered list of servers. Correctly configured clients will select the first entry from the list of servers returned in response to a DNS query. If for some reason the first server on the list does not respond, the client will try the second entry on the list, and so on until it establishes contact with a server. Returning an ordered list from the 'Find Best' function allows this behaviour to continue, but with the enhancement that the order the servers are tried by the client is optimised for that client according to the current values of the Content Selection Criteria.

The method described above may be controlled or implicated by a computer program. Any suitable programming language may be used to create the computer program, and the computer program may be executed on any suitable information processor in order to carry out the method.

Although the invention has been shown and described with respect to a best mode embodiment thereof, it should be understood by those skilled in the art that the foregoing and various other changes, omissions and additions in the form and detail thereof may be made therein without departing from the scope of the invention as claimed.

We claim:

1. A method of handling a resource request made by a client in a client network, the network including a Generic Local Lookup Service (GLLS) located at a network edge and a Generic Domain Lookup System (GDLS) located at a location remote from the network edge, the method comprising the steps of: receiving a resource request at the GLLS from the said client, the resource request identifying the requested resource; forwarding the resource request from the GLLS to the GDLS; searching a database in the GDLS for a resource record associated with the requested resource; the GDLS analyzing a set of resource providers and determining the resource providers compatible with the resource request; transmitting a response containing a list of resource providers from the GDLS to the GLLS, the list including server selection criteria associated with the resource providers; the GLLS selecting the best resource provider in the list according to the server selection criteria and additional client information relating to a client performance characteristic, the additional client information including the client access speed; and the GLLS returning data to the client which identifies the best resource provider for the requested resource.

2. A method according to claim 1, wherein the additional client information is added to the resource request by the said client.

3. A method according to claim 1 wherein the additional client information is added to the resource request after said resource request is received at the GLLS from the client.

4. A method according to claim 1, further comprising the steps of the GLLS:
converting the resource request into a form processable by the GDLS; and
transmitting the converted resource request to the GDLS.

5. A method according to claim 1, wherein the resource request is a DNS record and the information in the resource request is contained within an additional DNS text field forming part of the DNS record.

6. A method according to claim 1, wherein the response transmitted by the GOLS is a DNS record and the server selection criteria of the compatible resource providers are contained within an additional ONS text field forming part of the DNS record.

7. A scaleable architecture for handling a resource request from a client, the resource request comprising a first identity of a resource provider, the architecture comprising: a GLLS at a network edge for identifying a preferred resource provider for the requested resource to the client in response to receiving the resource request from the client, said preferred resource provider being defined by the resource provider that Is most compatible with the resource request with respect to Content Selection Criteria contained in the resource request; and a GDLS at a location remote from the client network for returning data identifying a set of resource providers and including server selection criteria associated with the resource providers in response to receipt of a converted resource request from the GLLS, the GLLS being operable to select et preferred resource provider based on the server selection criteria and additional client information relating to a client performance characteristic, the additional client information including the client access speed.

8. An architecture according to claim 7, wherein the resource request from the client further comprises the additional client information relating to a client performance characteristic.

9. An architecture according to claim 8, further comprising a content distribution point manager (CDPM) associated with the GDLS, the CDPM holding information on resource providers, said CDPM configured to provide information on all known resource providers able to supply the requested resource on receiving a query from the OLLS corresponding to the resource request received by the GLLS.

10. A computer readable storage medium storing instructions that, when executed on entities within a network, cause the entities to perform a method for handling a resource request, the method comprising the steps of; receiving a resource request at a GLLS located at a network edge from a client In the client network, the resource request identifying the requested resource; forwarding the resource request from the OILS to a GDLS at a location remote from the network edge; searching a database in the GDLS for a resource record associated with the requested resource the resource record including a series of executable instructions; the GDLS analyzing a set of resource providers and determining the resource providers compatible with the resource request; transmitting a response containing a list of resource providers from the GDLS to the GLLS, the list including server selection criteria associated with the resource providers; the GLLS selecting the best resource provider in the list according to the server selection criteria and additional client information relating to a client performance characteristic the additional client information including the client access speed; and the GLLS returning data to the client which identifies the best resource provider for the requested resource.

11. A method according to claim 2, wherein the server selection criteria includes information on one of the group comprising: a response time of said resource provider, a load on said resource provider, a distance to the resource provider from the client, and a throughput of the resource provider.

12. A method according to claim 1, wherein the requested resource is available on the resource provider but is not available on the GLLS.

13. A communications network comprising the scaleable architecture as claimed in claim 7.

14. A method according to claim 1 wherein the list of resource providers transmitted by the GDLS is in order of their compatibility with the resource request, the most compatible resource provider placed first.

15. A method according to claim 1 wherein the OLLS includes a Content Distribution Point Manager (CDPM), the CDPM adapted to provide information about local resource providers within an ISP domain.

16. A method according to claim 1 wherein the GDLS includes a Content Distribution Point Manager (CDPM), the CDPM adapted to provide information about resource providers throughout the network.

17. A method according to claim 1, wherein the additional client information includes the client location in the network.

* * * * *